United States Patent
Park et al.

(10) Patent No.: US 10,161,464 B2
(45) Date of Patent: Dec. 25, 2018

(54) ABRASION COMPENSATION DEVICE, CLUTCH ACTUATOR UNIT INCLUDING ABRASION COMPENSATION DEVICE, AND VEHICLE INCLUDING CLUTCH ACTUATOR UNIT

(71) Applicant: Hyundai Motor Company, Seoul (KR)

(72) Inventors: In Tae Park, Seongnam-si (KR); Jong Min Kim, Busan (KR); Jinwoo Lee, Dongsong-eup (KR); Euihee Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/348,861

(22) Filed: Nov. 10, 2016

(65) Prior Publication Data
US 2017/0370427 A1    Dec. 28, 2017

(30) Foreign Application Priority Data

Jun. 27, 2016    (KR) .......................... 10-2016-0080275

(51) Int. Cl.
*F16D 13/75* (2006.01)
*F16D 23/12* (2006.01)
(Continued)

(52) U.S. Cl.
CPC ............. *F16D 23/12* (2013.01); *F16D 13/38* (2013.01); *F16D 13/583* (2013.01);
(Continued)

(58) Field of Classification Search
USPC ...................................................... 192/111.11
See application file for complete search history.

(56) References Cited

U.S. PATENT DOCUMENTS

| 1,631,969 A | * | 6/1927 | Leonhauser | ............ F16D 65/56 188/196 BA |
| 2,814,210 A | * | 11/1957 | Ford | ....................... B64C 13/30 74/501.5 R |

(Continued)

FOREIGN PATENT DOCUMENTS

| JP | 2002-295518 A | 10/2002 |
| KR | 10-2007-0037193 A | 4/2007 |

(Continued)

*Primary Examiner* — Mark A Manley
(74) *Attorney, Agent, or Firm* — Morgan, Lewis & Bockius LLP (57) ABSTRACT

A clutch actuator unit that includes an abrasion compensation device and removes an adhesive force between a clutch disc and a flywheel by using a diaphragm spring to press the clutch disc against the flywheel and by using a fork to push a first side of the diaphragm spring may include an outer member including a groove and a female screw portion, a push rod pushing against a first side of the fork, an inner member including a male screw portion screwed into the female screw portion, including a rotation center portion of a rear end portion thereof in which a support portion is formed, and including a first gear portion, a fixed guide member guiding the outer member, a pushing member including a second gear portion meshed with the first gear portion, an actuator employing an actuator rod to push or pull the pushing member, and a controller controlling the actuator.

11 Claims, 8 Drawing Sheets

(51) Int. Cl.
*F16D 13/58* (2006.01)
*F16D 13/38* (2006.01)
F16D 23/14 (2006.01)

(52) U.S. Cl.
CPC ...... *F16D 13/752* (2013.01); *F16D 2023/126* (2013.01); *F16D 2023/141* (2013.01)

(56) References Cited

U.S. PATENT DOCUMENTS

| | | | |
|---|---|---|---|
| 4,378,713 A | 4/1983 | Haskell et al. | |
| 8,220,348 B2 * | 7/2012 | Maurel | F16D 13/752 |
| | | | 192/97 |
| 9,121,457 B2 * | 9/2015 | Lee | F16D 13/75 |

FOREIGN PATENT DOCUMENTS

| | | |
|---|---|---|
| KR | 10-1235975 B1 | 2/2013 |
| KR | 10-1292623 51 | 5/2013 |
| KR | 10-1295114 B1 | 8/2013 |
| KR | 10-1417665 B1 | 7/2014 |
| KR | 10-1489500 B1 | 1/2015 |

\* cited by examiner

FIG. 1

(a) Section II  (b) Section III  (c)

ABRASION COMPENSATION DEVICE, CLUTCH ACTUATOR UNIT INCLUDING ABRASION COMPENSATION DEVICE, AND VEHICLE INCLUDING CLUTCH ACTUATOR UNIT

CROSS-REFERENCE TO RELATED APPLICATION

The present application claims priority to Korean Patent Application No. 10-2016-0080275, filed Jun. 27, 2016, the entire contents of which is incorporated herein for all purposes by this reference.

BACKGROUND OF THE INVENTION

Field of the Invention

The present invention relates to an abrasion compensation device, a clutch actuator unit including the abrasion compensation device, and a vehicle including the clutch actuator unit that may improve torque transmission efficiency and operational stability of a clutch by mechanically compensating for wear on the clutch to reliably remove wear clearance of the clutch.

Description of Related Art

Typically, a clutch of a manual transmission for a vehicle transmits power by pressing a clutch disc against a flywheel with a pressure plate, and disconnects power by stopping pressing the clutch disc so as to enter a shift mode.

Accordingly, when a driver depresses a clutch pedal, the pedal effort is transmitted to an operation fork to operate a clutch release bearing, such that the clutch is released.

In an automated manual transmission or a dual-clutch transmission, an electromagnetic actuator that uses a motor and the like as a driving source operates an operating fork so as to operate a clutch, and thus speed can be changed without manual shifting by a driver as in a manual transmission.

According to the related art, when an electric signal is applied to a clutch actuator, the clutch actuator receives the signal so as to rotate a motor, a roller cam is operated which has a spirally cut portion at its center and is connected to a lead screw of the motor shaft. With the operation of the roller cam, a lever is pushed up so that it pushes a release bearing adjacent the distal portion of the lever, and thereby engage force transmitted to a diaphragm spring and a pressure plate of a clutch is increased, so that the clutch disc is strongly pushed and the driving force is transmitted between an engine and a transmission.

According to the related art, however, if a disc facing of a pressure plate is worn as a clutch undergoes repeated shift operations, free travel of the clutch disc is increased, and thus shock or slip may occur in the shift operation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an abrasion compensation device, a clutch actuator unit including the abrasion compensation device, and a vehicle including the clutch actuator unit which is capable of reducing a shift shock and stably controlling a slip state in a shift operation by automatically compensating for wear of a clutch that is generated during transmission of torque from an engine to an transmission.

According to various aspects of the present invention, a clutch actuator unit that includes an abrasion compensation device and removes an adhesive force between a clutch disc and a flywheel by using a diaphragm spring to press the clutch disc against the flywheel and by using a fork to push one side of the diaphragm spring may include an outer member including a groove opened at a rear thereof and including a female screw portion formed on an inner circumference surface of the groove, a push rod connected to a front of the outer member and pushing against one side of the fork, an inner member including a male screw portion screwed into the female screw portion formed on an outer circumference surface of the inner member and changing length thereof inserted in the groove by rotating around a central axis of the outer member, including a rotation center portion of a rear end portion thereof in which a support portion is formed, and including a first gear portion formed at an outer side of the support portion, a fixed guide member guiding the outer member so that the outer member is not rotated but is moved in front and rear directions and including a reference pin formed at a front thereof which is a position corresponding to a position of the support portion, a pushing member including a second gear portion meshed with the first gear portion and pushing the inner member forward in a state where the second gear portion and the first gear portion are joined, an actuator employing an actuator rod to push the pushing member forward or to pull the pushing member rearwards, and a controller controlling the actuator.

When the controller controls the actuator to pull the pushing member a preset distance rearwards, the first gear portion and the second gear portion may be separated from each other, and the fork may push the push rod, the outer member, and the inner member rearwards using an elastic force of the diaphragm spring, and when the outer member is further pulled back by a force of the fork in a state where the support portion is supported by the reference pin so that pulling-back of the inner member is prevented, the inner member may be rotated to be inserted into the groove of the outer member in a screw structure including the female screw portion and the male screw portion so that a distance between the inner member and the outer member is reduced as much as a preset distance.

The first gear portion and the second gear portion may have a gear structure corresponding to each other.

The first gear portion and the second gear portion may be circularly disposed around the support portion.

At least one of a guide groove and a guide protrusion may be formed on an outer circumference surface of the outer member in the front and rear directions, and at least one of a groove and a protrusion corresponding to the at least one guide groove and guide protrusion may be formed on an inner circumference surface of the fixed guide member.

The push rod may push one end portion of the fork around a pivot.

The clutch actuator unit may further include a release bearing pushing against an inner side of the diaphragm spring, in which the fork may push against the release bearing.

According to various aspects of the present invention, an abrasion compensation device may include an outer member including a groove of which the rear is opened and includes a female screw portion formed on an inner circumference surface of the groove, a push rod connected to a front of the outer member and pushing one side of the fork, an inner member including a male screw portion screwed into the female screw portion formed on an outer circumference surface of the inner member, changing length thereof inserted in the groove by rotating around a central axis of the outer member, including a rotation center portion of a rear end portion thereof in which a support portion is formed and including a first gear portion formed at an outer side of the support portion, a fixed guide member guiding the outer member so that the outer member is not rotated but is moved in front and rear directions, and including a reference pin formed at a front thereof which is a position corresponding to a position of the support portion, a pushing member including a second gear portion meshed with the first gear portion and pushing the inner member forward in a state where the second gear portion and the first gear portion are joined, an actuator using an actuator rod to push the pushing member forward or to pull the pushing member rearwards, and a controller controlling the actuator.

According to various aspects of the present invention, a vehicle may include a clutch actuator unit including an abrasion compensation device and removing an adhesive force between a clutch disc and a flywheel by using a diaphragm spring to press the clutch disc against the flywheel and by using a fork to push one side of the diaphragm spring, and an engine that delivers torque to the flywheel, in which the clutch actuator unit may include an outer member including a groove of which a rear thereof is opened and includes a female screw portion formed on an inner circumference surface of the groove, a push rod connected to the front of the outer member and pushing one side of the fork, an inner member including a male screw portion screwed into the female screw portion formed on an outer circumference surface of the inner member, changing length thereof inserted in the groove by rotating around a central axis of the outer member, including a rotation center portion of a rear end portion thereof in which a support portion is formed, and including a first gear portion formed at an outer side of the support portion, a fixed guide member guiding the outer member so that the outer member is not rotated but is moved in front and rear directions and including a reference pin formed at a front thereof which is a position corresponding to a position of the support portion, a pushing member including a second gear portion meshed with the first gear portion and pushing the inner member forward in a state where the second gear portion and the first gear portion are joined, an actuator employing an actuator rod to push the pushing member forward or to pull the pushing member rearwards, and a controller controlling the actuator.

The vehicle may further include a transmission receiving torque from the clutch disc and changing the received torque.

The abrasion compensation device, the clutch actuator unit, and the vehicle according to various embodiments of the present invention may mechanically compensate for a stroke of the push rod in order to compensate for abrasion of the clutch disc used by the transmission, may improve torque transmission efficiency of the clutch, may reduce a shift shock, and may stably control a slip state of the clutch.

Further, unlike a conventional wear compensating device, various embodiments of the present invention may use a mechanical coupling structure to compensate for the stroke corresponding to only an amount of abrasion and may improve reliability and stability of the abrasion compensation device without using separate complex control logic.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
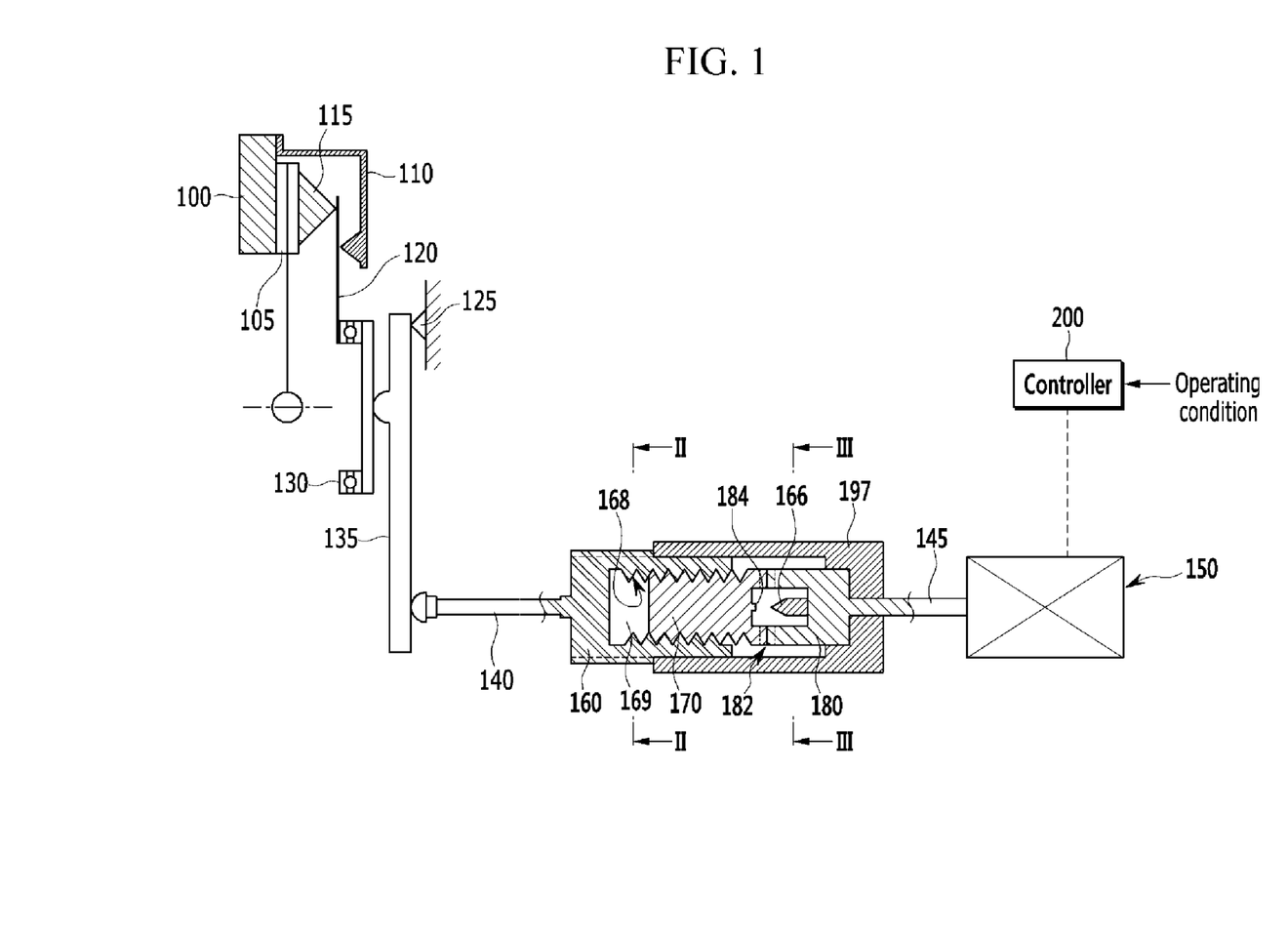
FIG. 1 is a configuration diagram showing a state before operating a clutch actuator unit according to various embodiments of the present invention.

FIG. 1 is a configuration diagram showing a state before operating a clutch actuator unit according to various embodiments of the present invention.

Referring to FIG. 1, the clutch actuator unit includes a flywheel 100, a clutch disc 105, a pressure plate 115, a clutch cover 110, a diaphragm spring 120, a release bearing 130, a pivot 125, a fork 135, a push rod 140, an outer member 160, a groove 169, a female screw portion 168, an inner member 170, a gear portion 182, a support portion 184, a pushing member 180, an actuator rod 145, an actuator 150, a fixed guide member 197, a reference pin 166, and a controller 200.

The flywheel 100 may receive torque (or rotational force) from an engine and the clutch disc 105 may be disposed on one side of the flywheel 100. The pressure plate 115 may be disposed on one side of the clutch disc 105. An outer edge surface of the diaphragm spring 120 may attach the clutch disc 105 to one side of the flywheel 100 via the pressure plate 115.

The diaphragm spring 120 may elastically support the pressure plate 115 by using a pivot (no reference numeral given) formed in an inner side of the clutch cover 110. An inner side of the diaphragm spring 120 may be supported by the release bearing 130.

The pivot 125 may support an upper end portion of the fork 135, a front end portion of the push rod 140 may support a lower end portion of the fork 135, and a center portion of the fork 135 may support the release bearing 130.

When the fork 135 moves forward, the fork 135 may push the release bearing 130 forward, the release bearing 130 may push an inner side of the diaphragm spring 120 forward, and a frictional force (or an adhesive force) between the clutch disc 105 and the flywheel 100 may be eliminated. Thus, torque of the flywheel 100 may not be transmitted to the clutch disc 105.

The clutch disc 105 may be connected to an input shaft of a transmission and may transmit torque of the flywheel 100 to the input shaft of the transmission. The transmission may perform a shift operation in a state where torque is not transmitted from the flywheel 100 to the clutch disc 105.

Because a structure of the transmission, a connection structure between the engine output shaft and the flywheel 100, and principle of operation of a clutch are known techniques, a detailed description thereof is omitted in this specification.

In various embodiments of the present invention, a rear end portion of the push rod 140 may be connected to a front surface of the outer member 160 and a front end portion of the push rod 140 may press (or push) a lower end portion of the fork 135 forward.

The groove 169 of which the rear is opened may be formed in the outer member 160 and the female screw portion 168 may be formed on an inner circumference surface of the groove 169. A male screw portion may be formed on an outer circumference surface of the inner member 170 and the inner member 170 may be screwed into the groove 169.

The support portion 184 may be formed in a rotation center portion of a rear end portion of the inner member 170 and the gear portion 182 may be formed at an outer side of the support portion 184.

The pushing member 180 may push a rear surface of the inner member 170 forward and the gear portion 182 may be formed between a front surface of the pushing member 180 and the rear surface of the inner member 170.

In more detail, a first gear portion (no reference numeral given) may be formed at an edge of a rear surface of the inner member 170 and a second gear portion (no reference numeral given) meshed with the first gear portion may be formed at an edge of a front surface of the pushing member 180.

The front end portion of the actuator rod 145 may be integrally connected to the rear of the pushing member 180 and the actuator 150 may push the actuator rod 145 forward or may pull the actuator rod 145 rearwards.

Here, the pushing member 180 may be moved back and forth by the actuator 150 and may not rotate. Therefore, the inner member 170 may not be rotated in a state where the pushing member 180 and the inner member 170 are joined (or meshed).

The fixed guide member 197, which is a fixed part, may include a structure in which a rear end portion of the outer member 160 is inserted in the fixed guide member. The reference pin 166 corresponding to the support portion 184 may be fixed to an inner side of the fixed guide member 197. The fixed guide member 197 may guide the outer member 160 so that the outer member is not rotated but is moved back and forth.

Figure 2A:
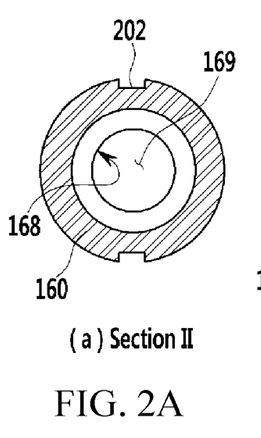
FIG. 2A, FIG. 2B, and FIG. 2C are a detailed cross-sectional view and a detailed perspective view of an abrasion compensation device according to various embodiments of the present invention.
Figure 2B:
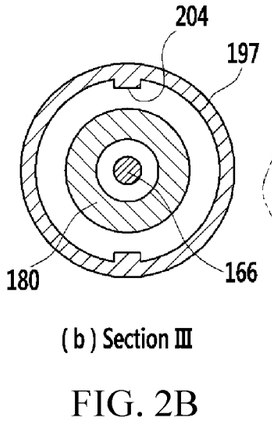
Figure 2C:
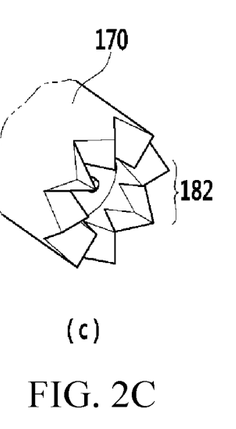

FIGS. 2A-2C are a detailed cross-sectional view and a detailed perspective view of an abrasion compensation device according to various embodiments of the present invention.

Referring to FIG. 2A, the groove 169 which is opened rearwards may be formed in the outer member 160. The female screw portion 168 may be formed on an inner circumference surface of the groove 169. A guide groove (or a rotation preventing groove) 202 may be formed at an outer side of the outer member 160 in a length direction.

Referring to FIG. 2B, the fixed guide member 197 may have a structure in which a rear end portion of the outer member 160 is inserted therein. A guide protrusion (or a rotation preventing protrusion) 204 corresponding to the guide groove 202 may be formed at an inner side of the fixed guide member 197 in a length direction.

In various embodiments of the present invention, the guide groove 202 may be replaced with a guide protrusion and the guide protrusion 204 may be replaced with a guide groove.

Referring to FIG. 2C, the first gear portion of the gear portion 182 may be formed at an edge of a rear surface of the inner member 170.

Figure 3:
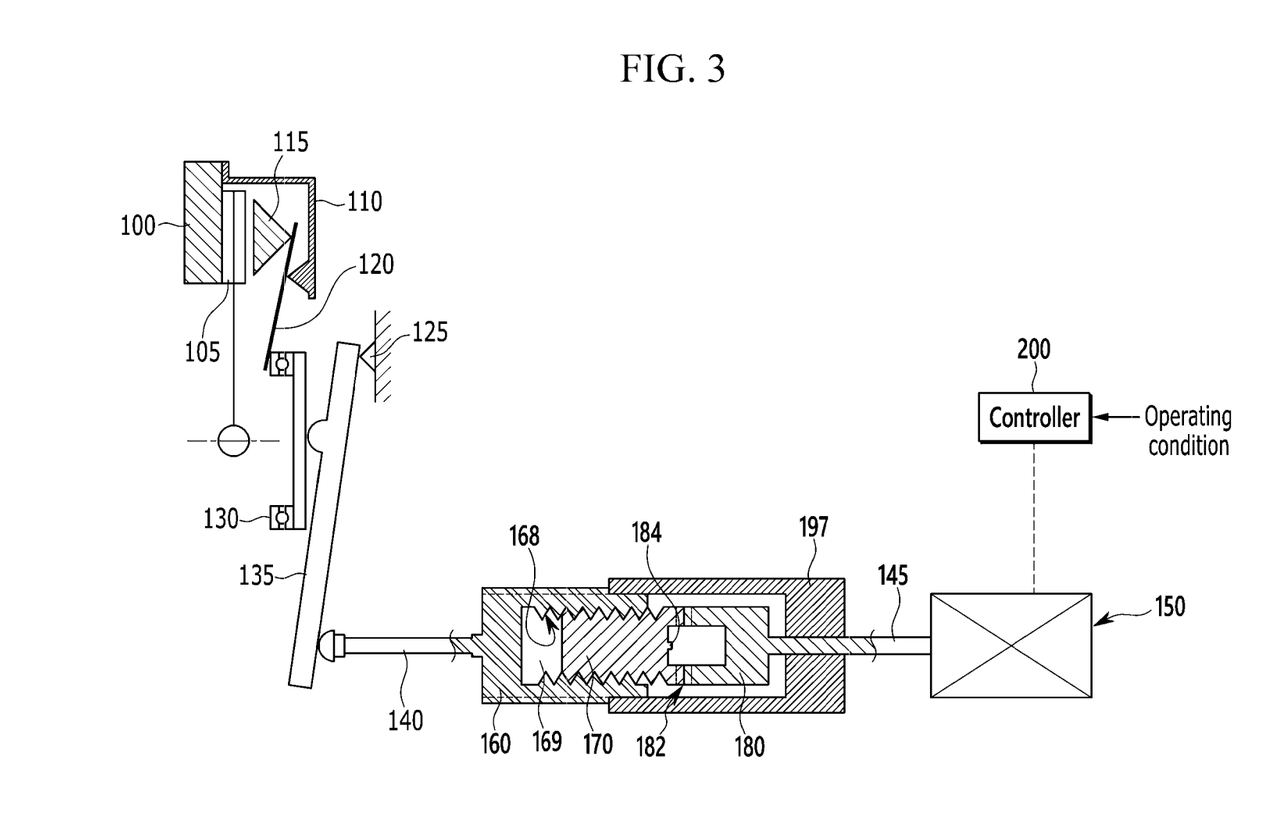
FIG. 3 is a configuration diagram showing an operating process of the clutch actuator unit according to the exemplary embodiment of the present invention.

FIG. 3 is a configuration diagram showing an operating process of the clutch actuator unit according to various embodiments of the present invention.

Referring to FIG. 3, when the actuator 150 uses the actuator rod 145 to push the pushing member 180 forward in a state where the second gear portion of the pushing member 180 is meshed (or engaged) with the first gear portion of the inner member 170, the pushing member 180 may use a screw structure including the female screw portion and the male screw portion to push the outer member 160 forward and the outer member 160 may use the push rod 140 to push a lower end portion of the fork 135 forward.

Here, the outer member 160 may not rotate because of a guide structure including the guide groove and the guide protrusion and the inner member 170 may not rotate because of a structure including the first gear portion and the second gear portion.

When the lower end portion of the fork 135 is moved forward, the release bearing 130 may move forward, an inner edge of the diaphragm spring 120 may move forward, an outer edge of the diaphragm spring 120 may move rearwards, the pressure plate 115 may be separated from the clutch disc 105, and a frictional force between the clutch disc 105 and the flywheel 100 may be removed.

Figure 4:
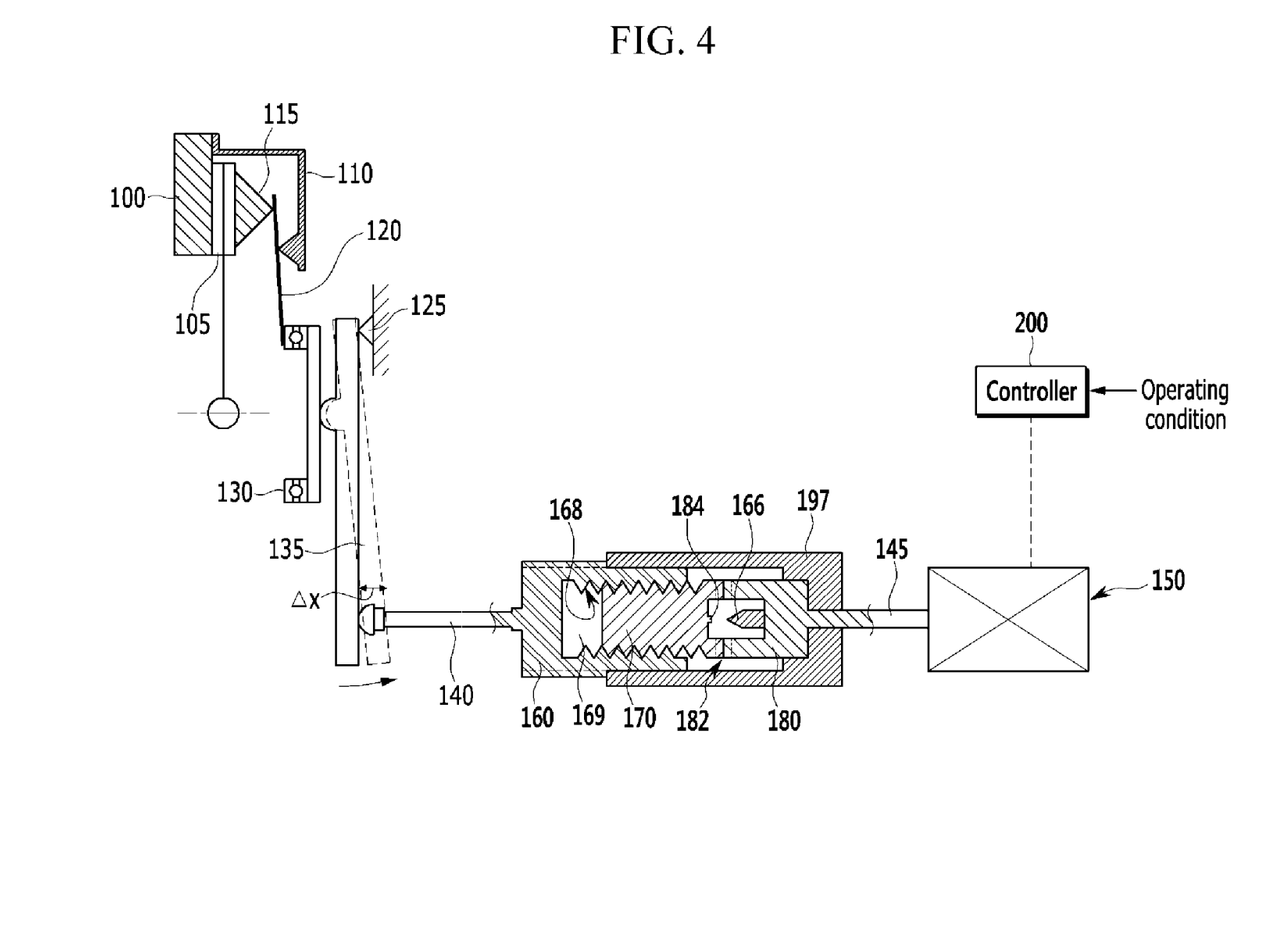
FIG. 4 is a configuration diagram showing a state where a clutch disc wears down in the clutch actuator unit according to various embodiments of the present invention.

FIG. 4 is a configuration diagram showing a state where the clutch disc wears down in the clutch actuator unit according to various embodiments of the present invention.

Referring to FIG. 4, the clutch disc 105 may wear down because of friction between the clutch disc and the flywheel 100. As a result, the inner edge of the diaphragm spring 120 and the release bearing 130 may move a preset distance Δx rearwards and the lower end portion of the fork 135 may move rearwards by the distance Δx.

Therefore, in order to ensure the frictional force between the clutch disc 105 and the flywheel 100 and to easily remove the frictional force, a distance between the push rod 140 and the actuator rod 145 should be reduced.

Figure 5:
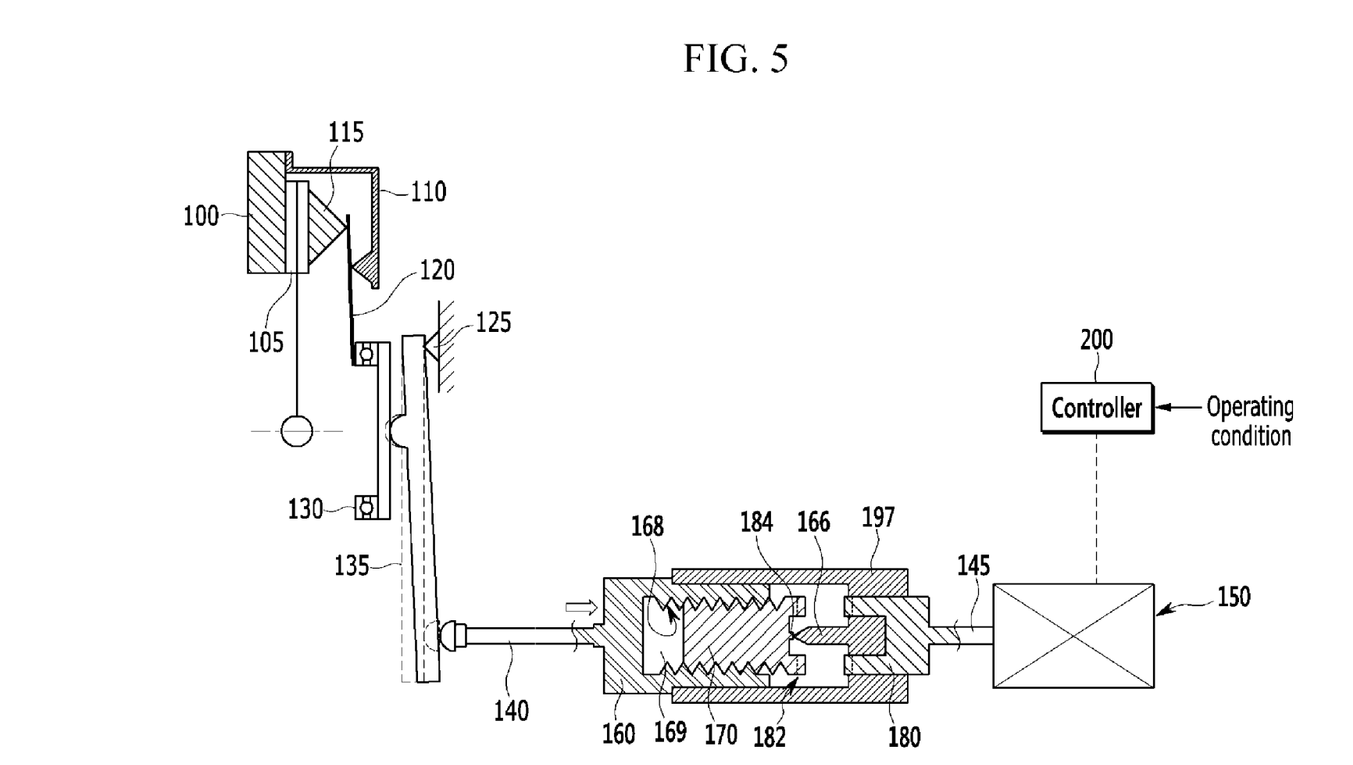
FIG. 5 is a configuration diagram showing an initial state in which the abrasion compensation device included in the clutch actuator unit according to various embodiments of the present invention is operated.

FIG. 5 is a configuration diagram showing an initial state in which the abrasion compensation device included in the clutch actuator unit according to various embodiments of the present invention is operated.

Referring to FIG. 5, based on a predetermined operating condition of a vehicle, the controller 200 may control the actuator 150 to pull back the pushing member 180 by a preset distance by using the actuator rod 145.

Then, the release bearing 130 may be pulled back by an elastic force of the diaphragm spring 120, the lower end portion of the fork 135 may be pulled back by a preset distance, and the push rod 140, the outer member 160 fixed to the push rod 140, the inner member 170 meshed with the outer member 160 may be pulled back by a preset distance such that the inner member 170 meshed with the outer member 160 rotates according to the movement of the outer member 160, and then the support portion 184 formed on a rear surface of the inner member 170 may in contact with a vertex of the reference pin 166.

Figure 6:
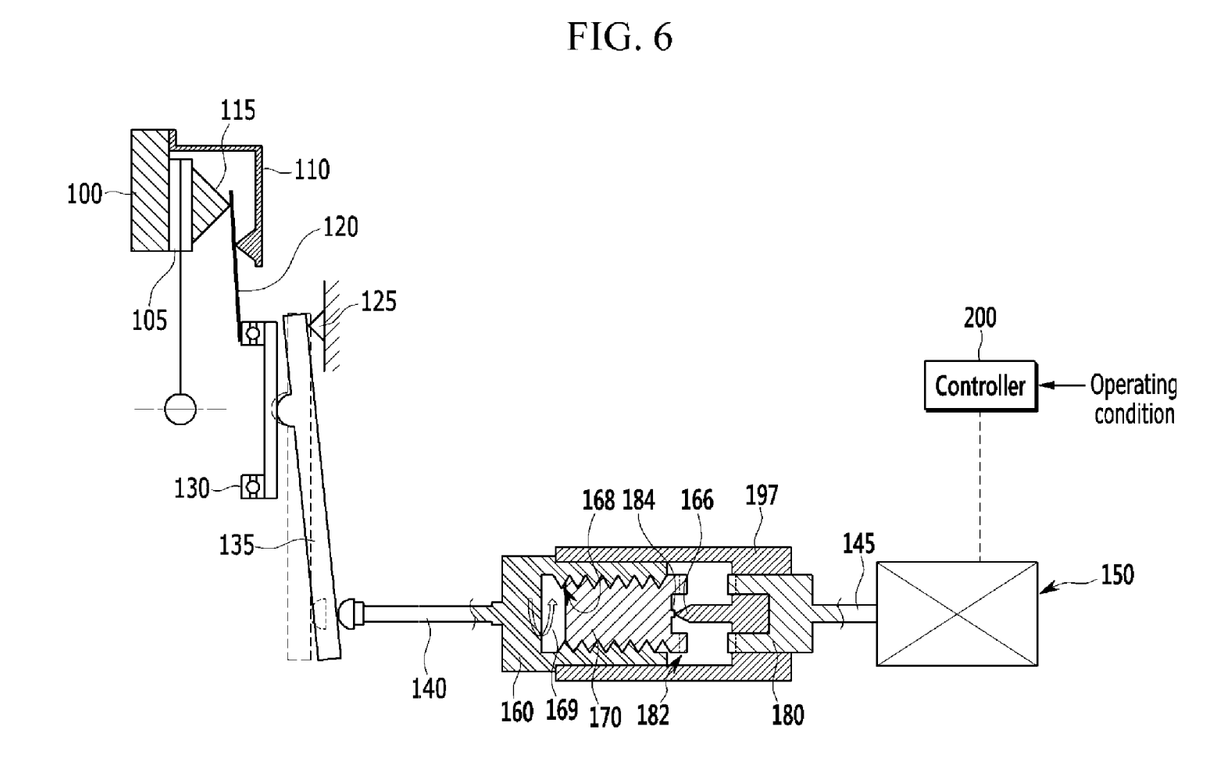
FIG. 6 is a configuration diagram showing an intermediate state in which the abrasion compensation device included in the clutch actuator unit according to various embodiments of the present invention is operated.

FIG. 6 is a configuration diagram showing an intermediate state in which the abrasion compensation device included in the clutch actuator unit according to various embodiments of the present invention is operated.

Referring to FIG. 6, when the lower end portion of the fork 135 further pulls back the push rod 140 in a state where the support portion 184 is in contact with the vertex of the reference pin 166, the inner member 170 may be rotated about the reference pin 166 to be inserted a preset distance into the groove 169 of the outer member 160.

Figure 7:
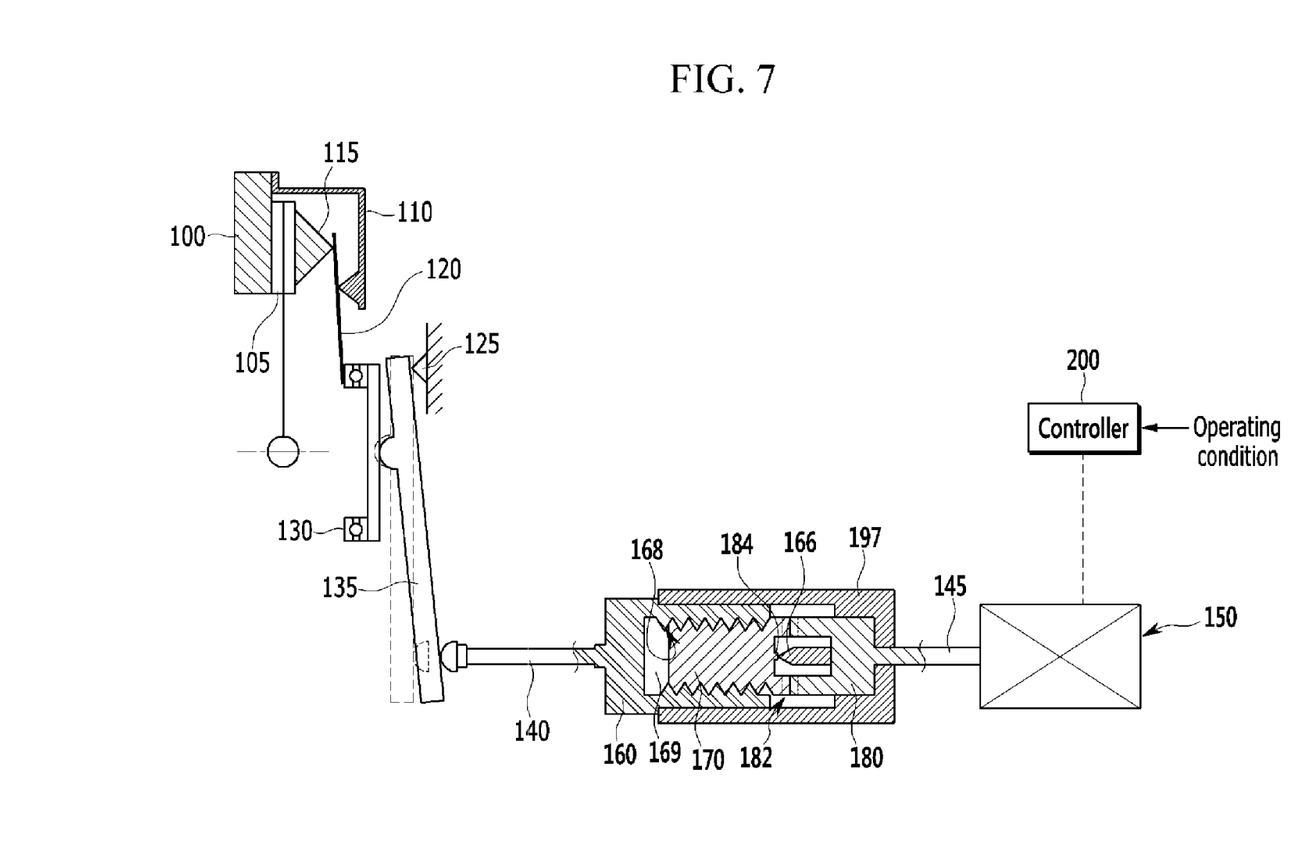
FIG. 7 is a configuration diagram showing a state in which an operation of the abrasion compensation device included in the clutch actuator unit according to various embodiments of the present invention is completed.

FIG. 7 is a configuration diagram showing a state in which an operation of the abrasion compensation device included in the clutch actuator unit according to various embodiments of the present invention is completed.

Referring to FIG. 7, the controller 200 may use the actuator rod 145 to push the pushing member 180 forward. The second gear portion of the pushing member 180 may be joined to the first gear portion of the inner member 170. The pushing member 180 may push the inner member 170.

Figure 8:
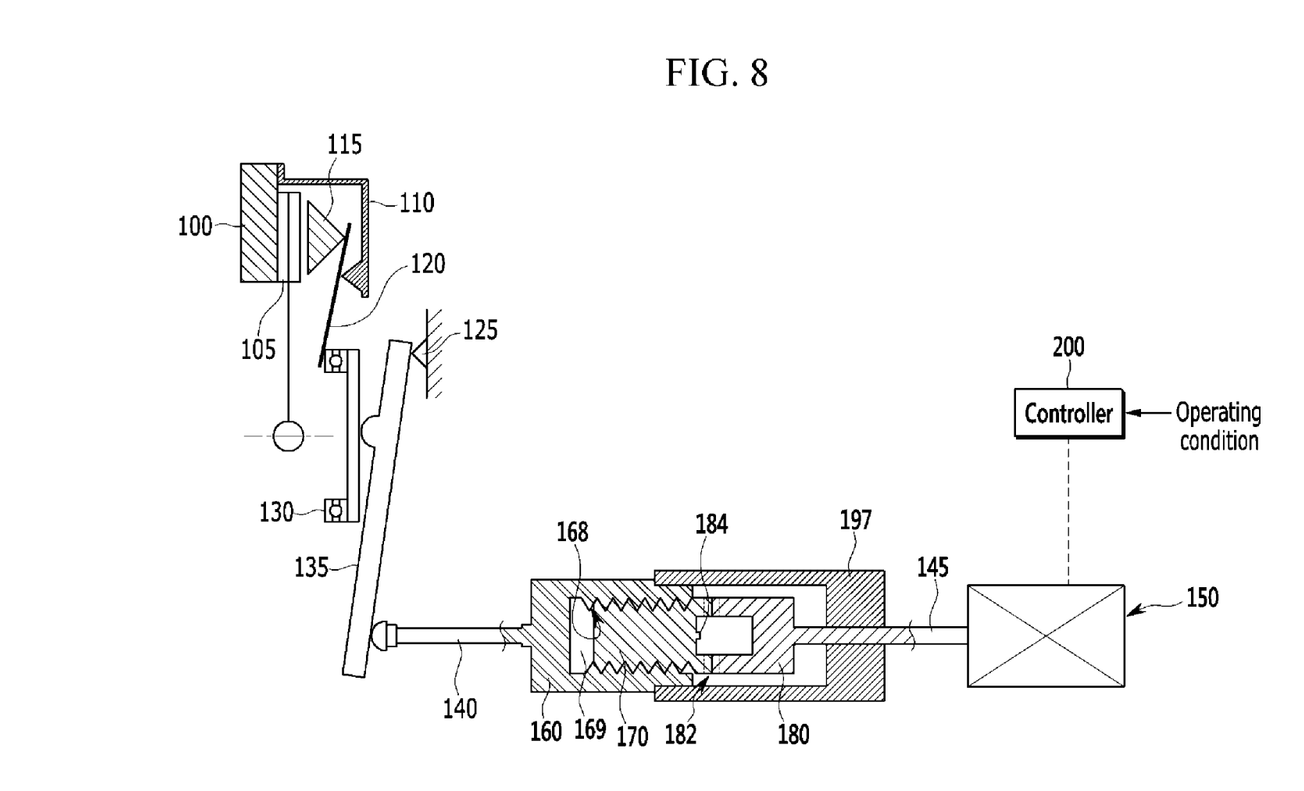
FIG. 8 is a configuration diagram showing an operating process of the clutch actuator unit in a state where abrasion is compensated for by the abrasion compensation device according to various embodiments of the present invention.

FIG. 8 is a configuration diagram showing an operating process of the clutch actuator unit in a state where abrasion is compensated for by the abrasion compensation device according to various embodiments of the present invention.

Referring to FIG. 8, the actuator 150 may use the actuator rod 145 to push the pushing member 180 forward in a state where the second gear portion of the pushing member 180 is meshed with the first gear portion of the inner member 170.

The pushing member 180 may use a screw structure including the female screw portion and the male screw portion to push the outer member 160 forward and the outer member 160 may use the push rod 140 to push a lower end portion of the fork 135 forward.

Here, the outer member 160 may not rotate because of a guide structure including the guide groove and the guide protrusion and the inner member 170 may not rotate because of a structure including the first gear portion and the second gear portion.

When the lower end portion of the fork 135 is moved forward, the release bearing 130 may move forward, an inner edge of the diaphragm spring 120 may move forward, an outer edge of the diaphragm spring 120 may move rearwards, the pressure plate 115 may be separated from the clutch disc 105, and a frictional force between the clutch disc 105 and the flywheel 100 may be removed.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch actuator device that includes an abrasion compensation device and removes an adhesive force between a clutch disc and a fly wheel by using a diaphragm spring to press the clutch disc against the flywheel and by using a fork to push a first side of the diaphragm spring, the clutch actuator device comprising:
   an outer member including a groove opened at a rear thereof and including a female screw portion formed on an inner circumference surface of the groove;
   a push rod fixedly connected to a front of the outer member and pushing against a first side of the fork;
   an inner member including a male screw portion screwed into the female screw portion and formed on an outer circumference surface of the inner member and changing length of the inner member inserted in the groove by rotating around a central axis of the outer member, including a rotation center portion of a rear end portion thereof in which a support portion is formed, and including a first gear portion formed at an outer side of the support portion;
   a fixed guide member to which the outer member is slidably engaged, the fixed guide member slidably guiding the outer member so that the outer member is not rotated but is moved in front and rear directions and including a reference pin formed at a front thereof which is a position corresponding to a position of the support portion;
   a pushing member including a second gear portion meshed with the first gear portion and pushing the inner member forward in a state where the second gear portion and the first gear portion are joined;
an actuator employing an actuator rod to push the pushing member forward or to pull the pushing member rearwards; and
a controller controlling the actuator,
wherein when the controller controls the actuator to pull the pushing member a preset distance rearwards, the first gear portion and the second gear portion are separated from each other, and the fork pushes the push rod, the outer member, and the inner member rearwards using an elastic force of the diaphragm spring, and
wherein when the outer member is further pulled back by a force of the fork in a state where the support portion is supported by the reference pin so that pulling-back of the inner member is prevented, the inner member is rotated to be inserted into the groove of the outer member in a screw structure including the female screw portion and the male screw portion so that a distance between the inner member and the outer member is reduced as much as a wear resultant distance.

2. The clutch actuator device of claim 1, wherein the first gear portion and the second gear portion have a gear structure corresponding to each other.

3. The clutch actuator device of claim 2, wherein the first gear portion and the second gear portion are circularly disposed around the support portion.

4. The clutch actuator device of claim 1, wherein at least one of a guide groove and a guide protrusion is formed on an outer circumference surface of the outer member in the front and rear directions, and at least one of a groove and a protrusion corresponding to the at least one guide groove and guide protrusion is formed on an inner circumference surface of the fixed guide member.

5. The clutch actuator device of claim 1, wherein the push rod pushes a first end portion of the fork around a pivot.

6. The clutch actuator device of claim 1, further comprising:
a release bearing pushing against an inner side of the diaphragm spring,
wherein the fork pushes against the release bearing.

7. An abrasion compensation device, comprising:
an outer member including a groove of which the rear is opened and includes a female screw portion formed on an inner circumference surface of the groove;
a push rod fixedly connected to a front of the outer member and pushing a first side of the fork;
an inner member including a male screw portion screwed into the female screw portion and formed on an outer circumference surface of the inner member, changing length of the inner member inserted in the groove by rotating around a central axis of the outer member, including a rotation center portion of a rear end portion thereof in which a support portion is formed and including a first gear portion formed at an outer side of the support portion;
a fixed guide member to which the outer member is slidably engaged, the fixed guide member slidably guiding the outer member so that the outer member is not rotated but is moved in front and rear directions, and including a reference pin formed at a front thereof which is a position corresponding to a position of the support portion;
a pushing member including a second gear portion meshed with the first gear portion and pushing the inner member forward in a state where the second gear portion and the first gear portion are joined;
an actuator using an actuator rod to push the pushing member forward or to pull the pushing member rearwards; and
a controller controlling the actuator,
wherein when the controller controls the actuator to pull the pushing member by a preset distance rearwards, the first gear portion and the second gear portion are separated from each other, and the fork pushes the push rod, the outer member, and the inner member rearwards by using an elastic force of a diaphragm spring, and
wherein when the outer member is further pulled back by a force of the fork in a state where the support portion is supported by the reference pin so that pulling-back of the inner member is prevented, the inner member is rotated to be inserted into the groove of the outer member in a screw structure including the female screw portion and the male screw portion so that a distance between the inner member and the outer member is reduced as much as a wear resultant distance.

8. The abrasion compensation device of claim 7, wherein the first gear portion and the second gear portion have a gear structure corresponding to each other.

9. The abrasion compensation device of claim 7, wherein at least one of a guide groove and a guide protrusion is formed on an outer circumference surface of the outer member in the front and rear directions, and at least one of a groove or a protrusion corresponding to the at least one guide groove and guide protrusion is formed on an inner circumference surface of the fixed guide member.

10. A vehicle comprising:
a clutch actuator unit including an abrasion compensation device and removing an adhesive force between a clutch disc and a flywheel by using a diaphragm spring to press the clutch disc against the flywheel and by using a fork to push a first side of the diaphragm spring; and
an engine that delivers torque to the flywheel,
wherein the clutch actuator unit comprises:
an outer member including a groove of which a rear thereof is opened and includes a female screw portion formed on an inner circumference surface of the groove;
a push rod fixedly connected to the front of the outer member and pushing a first side of the fork;
an inner member including a male screw portion screwed into the female screw portion and formed on an outer circumference surface of the inner member, changing length of the inner member inserted in the groove by rotating around a central axis of the outer member, including a rotation center portion of a rear end portion thereof in which a support portion is formed, and including a first gear portion formed at an outer side of the support portion;
a fixed guide member to which the outer member is slidably engaged, the fixed guide member slidably guiding the outer member so that the outer member is not rotated but is moved in front and rear directions and including a reference pin formed at a front thereof which is a position corresponding to a position of the support portion;
a pushing member including a second gear portion meshed with the first gear portion and pushing the inner member forward in a state where the second gear portion and the first gear portion are joined;
an actuator employing an actuator rod to push the pushing member forward or to pull the pushing member rearwards; and a controller controlling the actuator, wherein when the controller controls the actuator to pull the pushing member a preset distance rearwards, the first gear portion and the second gear portion are separated from each other, and the fork pushes the push rod, the outer member, and the inner member rearwards using an elastic force of the diaphragm spring, and wherein when the outer member is further pulled back by a force of the fork in a state where the support portion is supported by the reference pin so that pulling-back of the inner member is prevented, the inner member is rotated to be inserted into the groove of the outer member in a screw structure including the female screw portion and the male screw portion so that a distance between the inner member and the outer member is reduced as much as a wear resultant distance.

11. The vehicle of claim 10 further comprising a transmission receiving torque from the clutch disc and changing the received torque.

* * * * *